Figure 1:
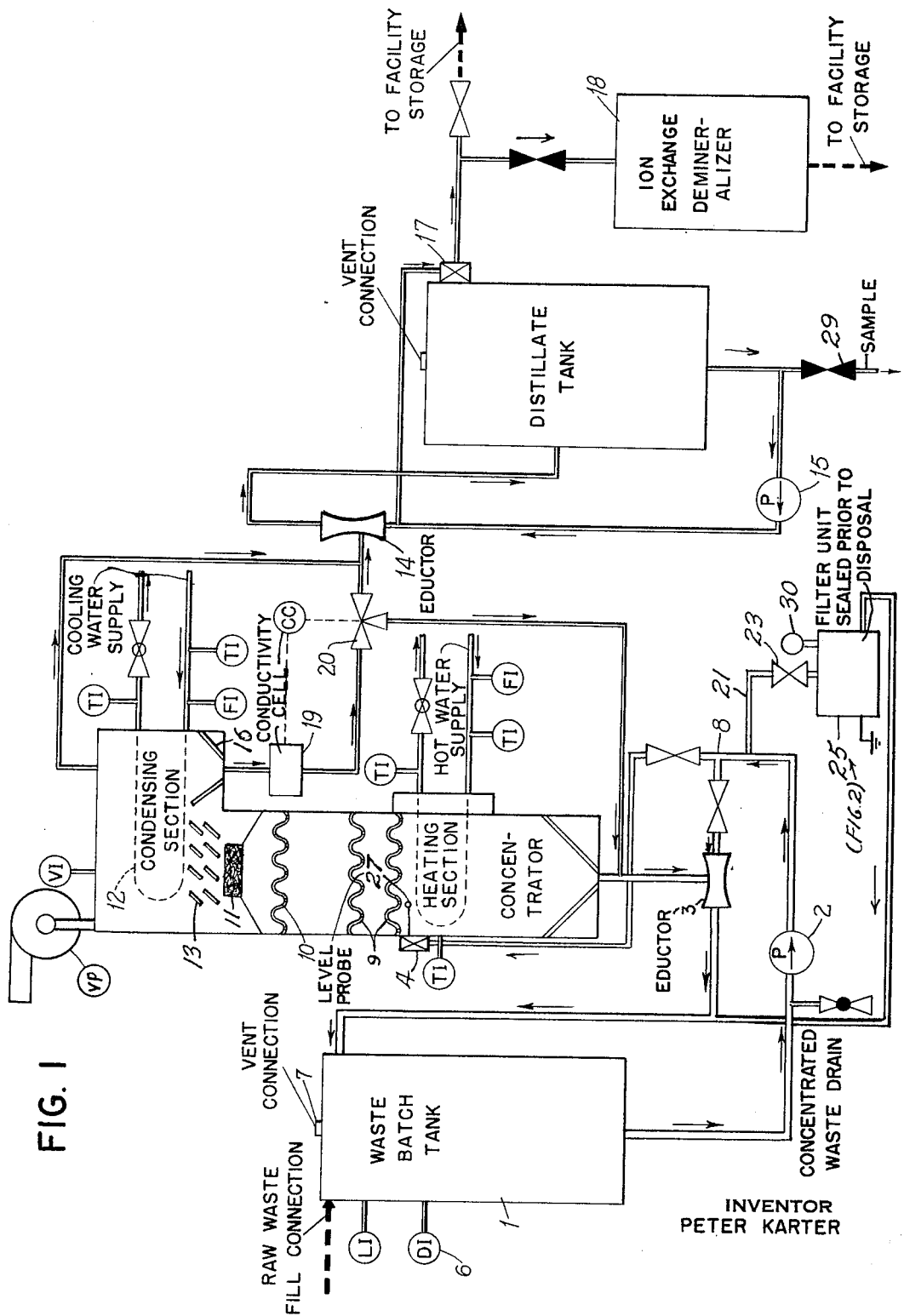

FIG. I

INVENTOR
PETER KARTER

INVENTOR
PETER KARTER 3,361,649
METHOD AND APPARATUS FOR DISTILLATION OF WASTE LIQUIDS AND SEPARATE RECOVERY OF SOLVENT AND SOLUTE
Peter Karter, York, Pa., assignor to American Machine & Foundry Company, a corporation of New Jersey
Filed Apr. 5, 1965, Ser. No. 445,545
3 Claims. (Cl. 203—47)

This invention relates to the disposal of noxious or toxic aqueous waste material which may be contaminated with material in solution or in suspension.

In particular the invention relates to a system of distilling water from an aqueous waste product. Thereafter the sludge-like material may be dewatered in a waste container which may be disposed of by burial, submersion or the like.

Numerous laboratory and industrial waste material present disposal problems including those contaminated with toxic chemicals, drugs, bacterial poisons and other noxious ingredients in dilute concentration. If these are merely poured onto the ground or into rivers the public water supply and health may be adversely affected. The present invention provides a system for the removal of pure water and production of a sludge concentrate from the waste material which may be solidified in a waste container without contamination of the surrounding atmosphere.

Figure 2:
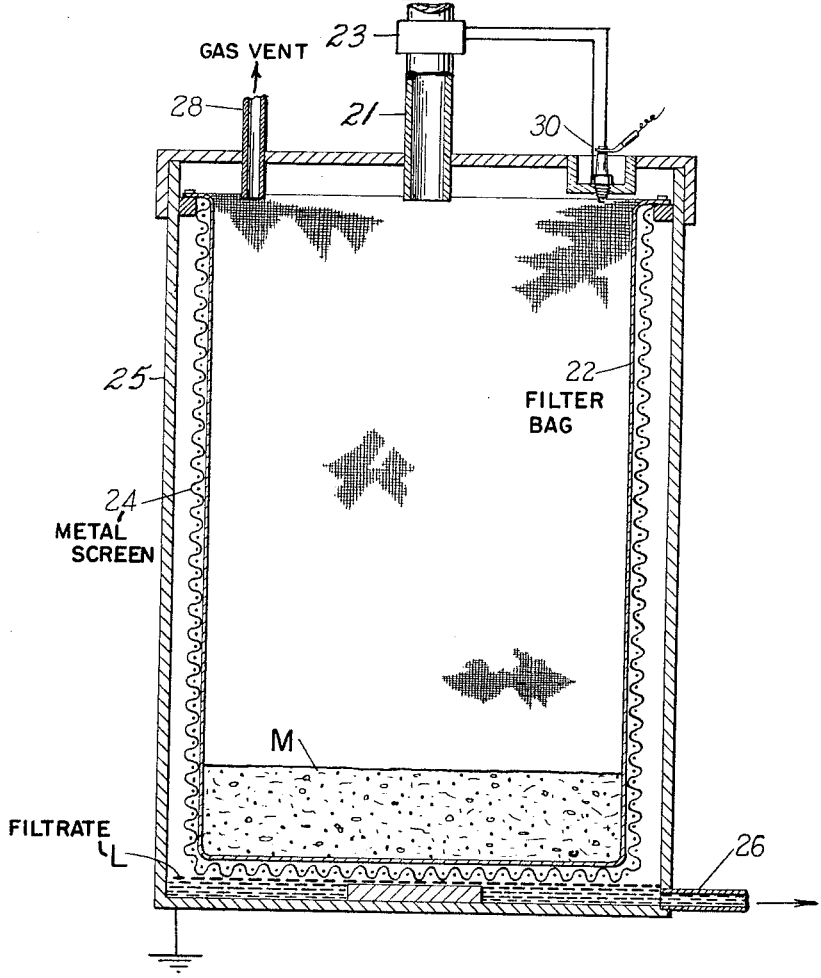

In the drawings:

FIGURE 1 is a schematic flow diagram of a low temperature vacuum distillation system containing a waste filter container and combined with an optional demineralizer which is used to process aqueous waste material; and FIGURE 2 is a sectional view of a waste filter container used in the system of FIGURE 1 in which the sludge like material is settled and collected and decanted liquids are bled away.

The invention operates in general through an apparatus by a process in which waste material introduced into a waste tank seen in FIGURE 1 at 1 is passed through a low temperature vacuum distillation unit known as a concentrator in which pure water is removed after condensing on cooling coils in the top of the unit. The removal of pure water substantially reduces the bulk of the waste product and increases its toxic concentration.

Heavy sludge resulting from the distillation process as the concentrate can be passed through a filtering device seen in FIGURE 2 in which a screen member supports a filter bag within a waste container. The liquid material which passes the filter is removed at the bottom of the container which is grounded and a spark plug type probe located at the top of the container shows when the container has been filled. A signal generated at the spark plug 30 can be used to operate a solenoid filling valve 23 in the pipe connection 21 so as to cut off the further supply of concentrated waste when a particular sludge level has been reached in the container 25. The liquid is returned for further distillation and sludge concentration at the vacuum still.

The waste distillation unit produces a very low solid content in the distillate by evaporation at low temperature and high vacuum. If there is a small amount of mineral material left in the distillate this can be removed by processing through ion exchange demineralizers seen at 18. The entire system may be skid mounted or installed in a trailer van or in a small space in a manufacturing plant.

In a preferred construction of this system, a waste batch tank 1 which is connected through a slurry pump 2 is connected to an evaporator section preferably by stainless steel piping and fittings. A preferred material of construction for the evaporator is stainless steel. If desired a window may be provided in the evaporator to allow inspection of the heater during operation and to allow inspection of the boiling surface during operation to check scaling, etc. During operation the heating section in the evaporator is submerged in the liquid waste and the bottom of the concentrator is provided with a conical bottom to promote drainage. The operation of the evaporator under low temperature reduces scaling and foaming and corrosion and also allows the use of low temperature waste heat from sources commonly available in a manufacturing plant.

In the operation of the device raw waste is fed into a batch tank 1 and is pumped by a pump 2 to a point 8 in the pipe system where approximately ⅓ of the flow goes to the concentrator through an automatic level controller 4 which is electrically connected to pump 2 and which maintains the correct quantity of material in the concentrator and submerges the heater. In the event the controller 4 fails by oversupplying feed, a separate probe 27, that is, a back-up level probe providing a fail-safe system and cutting the supply of liquid when it rises above the heating section, operating another control will shut down the pump 2 automatically. Approximately ⅔ of the flow at point 8 goes through an eductor 3 acting as a sludge pump located below the concentrator and is returned to the batch tank 1. The eductor 3 withdraws a portion of the liquid and thus maintains a uniform quality of waste in the concentrator batch feed tank. When the waste is returned to the tank, it is sprayed down to permit gases to come out of solution. These gases are withdrawn through filters through a vent connection 7 at the top of the batch tank. A density indicator device 6 shows the operator the concentration of solids in the batch tank.

The concentrator is designed as a low temperature, high vacuum unit, the vacuum being drawn by means of a vamuum pump VP and/or eductor 14 and special separators in the unit are placed above the boiling liquid. Two corrugated, perforated plate separators 9 with crests adjacent as shown in FIGURE 1, but preferably with crests at right angles are located immediately above the heating section just over the boiling surface. A further corrugated perforated plate separator 10 is located higher in the evaporator below a mesh separator 11 which may be packed with wire. The rising vapors, after passing through the separators and the mesh and flowing around baffles 13, impinge upon a cool surface in the condensing section 12, supplied with circulating cold liquid and are condensed. The moisture is recovered in trap 16 and moved to the distillate tank.

Heat is provided in the heating section by heating medium passing through a tube bundle submerged below the surface of the liquid waste. The distillate after condensing flows to an eductor 14 under the action of a pump 15. The distillate is tested for purity and either further treated, recycled or passed out of the system.

Since steam is not used in this system, there is no possibility of steam explosion to spread contamination in the disposal area. Temperatures in the system are below the normal atmospheric boiling temperature of water since the unit is operated under a vacuum. Because of the vacuum any leakage in the evaporator shell will draw air into the evaporator and avoid the spread of poisonous material outside the system. This is a fail safe feature of the invention.

Another feature of the invention provides circulation of raw waste material between the heating section of the evaporator and the waste feed tank which is supplied with not only raw waste but also liquid in an impure condition from subsequent processing of the sludge.

Preferred conditions for boiling are approximately 100° F. and a vacuum of about 27 in. of mercury. The rate of evaporation and distillation is controlled by throttling the heat and cooling water valves which supply the hot and cold sections of the evaporator. A level sensor or probe 27 may be used in the evaporator to ensure that the liquid level keeps the heater section submerged at all times and that the liquid does not rise too high in the evaporator shell. When the desired solids concentration is reached, the waste is removed by the operation of a sludge pump included in eductor 3 and transferred to a filter fitted tank 25 or disposal drain such as that seen in FIGURE 1 in which liquid material filters by gravity and is returned to the original evaporator section through the outlet 26 connected to level controller 4. Clearly the degree of concentration in the evaporator will vary according to the kind of material being processed but in a typical situation the solid content may be on the order of 50% when the sludge is removed from the evaporator. Non-condensable gases may be removed through vent connections provided with suitable filters in the waste and distillate tanks. Before the water vapors produced in the evaporator reach the condenser, they are preferably passed through separator devices 9, 10 and 11 mentioned above to remove droplets from the vapor and to increase the efficiency of decontamination. A conductivity cell 19 or similar instrument may be used to monitor the purity of the distillate which, if found unsatisfactory can be returned to be recycled through a valve 20 operated automatically by the sensing means.

In FIGURE 2, liquid waste is received through a pipe connection 21 and the solids are retained by a filter bag 22. The size of particles retained in the waste container is controlled by selection of filter media preferably of the micron-range. The filter bag 22 is supported by a metal screen 24 and the expressed liquid L returns to the waste system under gravity or under vacuum, through an outlet 26 at the bottom. A gas vent connection 28 is provided and is preferably filtered. A spark plug type level probe indicator 30 or the like may be located at any desired level in the container and is electrically connected to solenoid valve 23 of the filter tank 25 when material in the tank has reached said level and closes a circuit to close said valve. After the material M has filled the container, a moisture absorbent material such as vermiculite or cement is added to the void spaces at the top and bottom of the container to absorb any free liquid. The container openings will be plugged and the container can then be disposed of by burial, submersion or the like.

What is claimed is:
1. Apparatus for filtering solids from liquid concentrate comprising a waste container, a filter bag supported in said container on a screen remote from the container walls, an inlet within said bag and an outlet drain at the bottom of said container between said screen and walls, a vapor vent and a spark plug continually energized to indicate when said container is full.

2. A method of concentrating aqueous waste comprising:
 (a) first distilling waste containing water at elevated temperatures to produce a waste sludge and water vapor, said water vapor being subsequently condensed before further treatment and collection,
 (b) second filtering said sludge within a disposal unit to obtain a dewatered sludge and a filtrate and returning the filtrate to further distillation; and
 (c) third permanently sealing said dewatered sludge in said disposal unit.

3. An aqueous waste concentration system comprising:
 (a) a liquid waste feed tank including means for off gasing of vapors to reduce carryover in the distillate; an evaporator including a heating section, means for monitoring the quantity of the solution being concentrated by automatically maintaining the level of said solution in the evaporator, said means being located outside of the evaporator;
 (b) said evaporator being connected to said tank and comprising an indirect heating means adjustable between about 100° F. and 212° F. and disposed in the lower portion of said evaporator;
 (c) means providing continuous circulation of material being concentrated between the waste batch tank and the concentrator;
 (d) an automatic level sensor in the concentrator for maintaining a predetermined level, with a back-up level probe providing a fail-safe system;
 (e) said evaporator having a recycling conduit and a conductivity cell in the conduit;
 (f) a pair of adjacent corrugated, perforated plates, with crests adjacent each other disposed horizontally in said evaporator above said heating means and providing droplet and particulate separation;
 (g) a third perforated corrugated perforated plate above and beyond said pair of plates, providing additional separation;
 (h) a packed wire mesh separator above said third plate;
 (i) vapor cooling and condensing means above said separator;
 (j) a vapor baffle and means for collecting condensate;
 (k) vacuum means connected to said evaporator;
 (l) means pumping liquid distillate from the condenser to the distillate tank;
 (m) means sensing the purity of the distillate, and means diverting impure distillate to said feed tank and pure distillate to said distillate tank; and
 (n) means recycling a portion of the distillate from the distillate tank and back continuously, said recycling means inducting a pure condensate upon detection of same by the conductivity cell and said cell bypassing impure condensate to said evaporator upon detection of the impure condensate by the cell.

References Cited

UNITED STATES PATENTS

| | | | |
|---|---|---|---|
| 851,045 | 4/1907 | Ullrick | 202—181 X |
| 2,140,623 | 12/1938 | Hetzer | 202—181 |
| 2,441,361 | 5/1948 | Kirgan | 202—181 |
| 2,767,967 | 10/1956 | Hutchinson | 202—158 X |
| 2,877,091 | 3/1959 | Hiskey. | |
| 3,035,634 | 5/1962 | Waine et al. | 159—44 |
| 3,152,984 | 10/1964 | Winsche et al. | |
| 3,204,766 | 9/1965 | Schmidt | 210—86 |
| 3,205,588 | 9/1965 | Oetjen et al. | 252—301.1 |

FOREIGN PATENTS 1,283,391  12/1961  France.

WILBUR L. BASCOMB, JR., *Primary Examiner.*

NORMAN YUDKOFF, *Examiner.*

J. SOFER, *Assistant Examiner.*

UNITED STATES PATENT OFFICE

CERTIFICATE OF CORRECTION

Patent No. 3,361,649                                January 2, 1968

Peter Karter

It is hereby certified that error appears in the above numbered patent requiring correction and that the said Letters Patent should read as corrected below.

Figure 3:
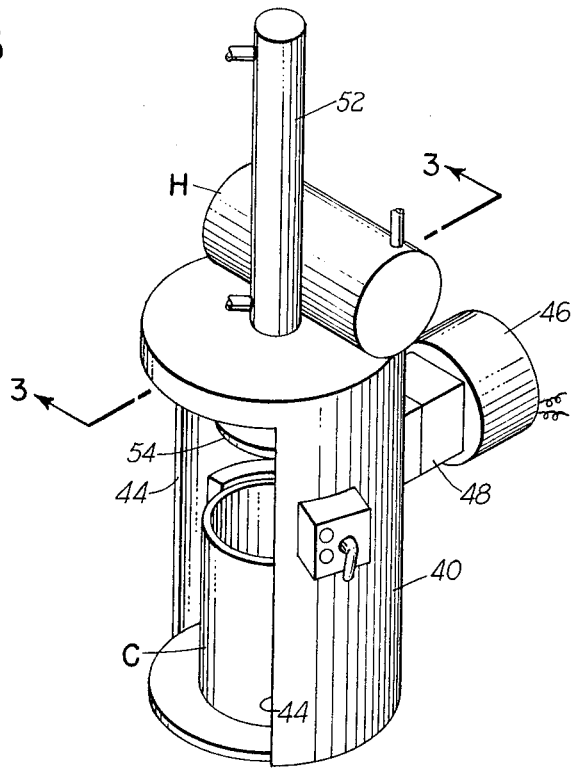
Figure 4:
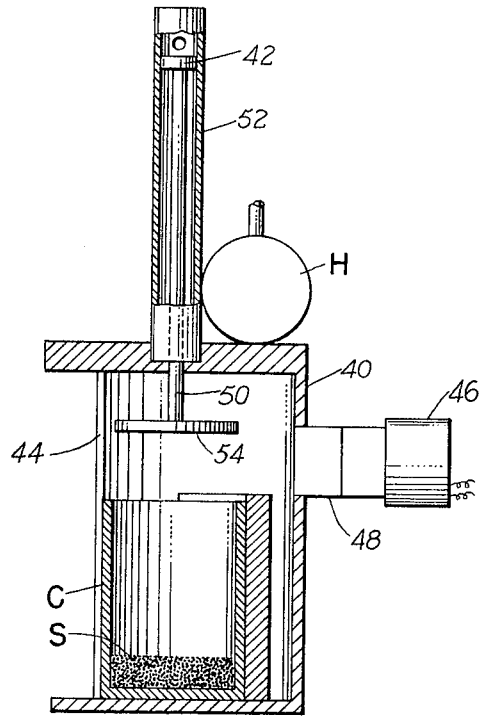

In the drawings, strike out Sheet 3, including Figures 3 and 4; Sheet 1, in the heading, line 4 thereof, for "3 Sheets-Sheet 1" read -- 2 Sheets-Sheet 1 --; Sheet 2, in the heading, line 4 thereof, for "3 Sheets-Sheet 2" read -- 2 Sheets-Sheet 2 --.

Signed and sealed this 1st day of April 1969.

(SEAL)
Attest:

Edward M. Fletcher, Jr.                                EDWARD J. BRENNER

Attesting Officer                                           Commissioner of Patents